(12) United States Patent
Carluccio et al.

(10) Patent No.: US 12,689,535 B2
(45) Date of Patent: Jul. 21, 2026

(54) REMOTE CONFIGURATION OF VIDEOCONFERENCE SETTINGS

(71) Applicant: Zoom Video Communications, Inc., San Jose, CA (US)

(72) Inventors: Andrew Carluccio, San Francisco, CA (US); Matthew Hoffman, Glen Allen, VA (US)

(73) Assignee: Zoom Communications, Inc., San Jose, CA (US)

( * ) Notice: Subject to any disclaimer, the term of this patent is extended or adjusted under 35 U.S.C. 154(b) by 33 days.

(21) Appl. No.: 18/053,190

(22) Filed: Nov. 7, 2022

(65) Prior Publication Data

US 2024/0154831 A1    May 9, 2024

(51) Int. Cl.
H04L 12/18        (2006.01)
H04N 7/15        (2006.01)

(52) U.S. Cl.
CPC ........... H04L 12/1822 (2013.01); H04N 7/15 (2013.01)

(58) Field of Classification Search
CPC .............................. H04L 12/1822; H04N 7/15
See application file for complete search history.

(56) References Cited

U.S. PATENT DOCUMENTS

| | | | | |
|---|---|---|---|---|
| 8,830,296 | B1 * | 9/2014 | Vivekanandan | ....... H04N 7/152 709/204 |
| 11,082,246 | B1 * | 8/2021 | Olson | ..................... H04L 65/65 |
| 11,270,264 | B1 * | 3/2022 | Casale | .................. H04L 65/403 |
| 11,330,026 | B1 * | 5/2022 | Han | ....................... G06F 3/1454 |
| 2002/0138569 | A1 * | 9/2002 | Slutsman | ............ H04L 65/4046 348/E7.083 |
| 2014/0365921 | A1 * | 12/2014 | Gupta | ................. H04L 65/4038 715/758 |
| 2022/0365984 | A1 * | 11/2022 | Faulkner | ................ G06N 20/00 |

* cited by examiner

*Primary Examiner* — Azizul Choudhury
(74) *Attorney, Agent, or Firm* — Kilpatrick Townsend and Stockton LLP

(57)        ABSTRACT

In some implementations, the device may include receiving, by a first computing device from a second computing device, a request to access virtual conference client software executed by the first computing device, the first and second computing devices connected to a virtual conference hosted by a virtual conference provider. In addition, the device may include granting, by the first computing device to the second computing device, permission to access the virtual conference client software. The device may include receiving, by the first computing device from the second computing device, a command to change a configuration parameter in the virtual conference client software. Moreover, the device may include changing the configuration based on the command.

20 Claims, 8 Drawing Sheets

710 ～ RECEIVE A REQUEST TO ACCESS VIRTUAL CONFERENCE CLIENT SOFTWARE

720 ～ GRANT PERMISSION TO ACCESS THE VIRTUAL CONFERENCE CLIENT SOFTWARE

730 ～ RECEIVE A COMMAND TO CHANGE A CONFIGURATION PARAMETER IN THE VIRTUAL CONFERENCE CLIENT SOFTWARE

740 ～ CHANGE THE CONFIGURATION BASED ON THE COMMAND

700

REMOTE CONFIGURATION OF VIDEOCONFERENCE SETTINGS

FIELD

This disclosure generally relates to video conferencing, and more specifically relates to remotely configuring videoconference settings.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
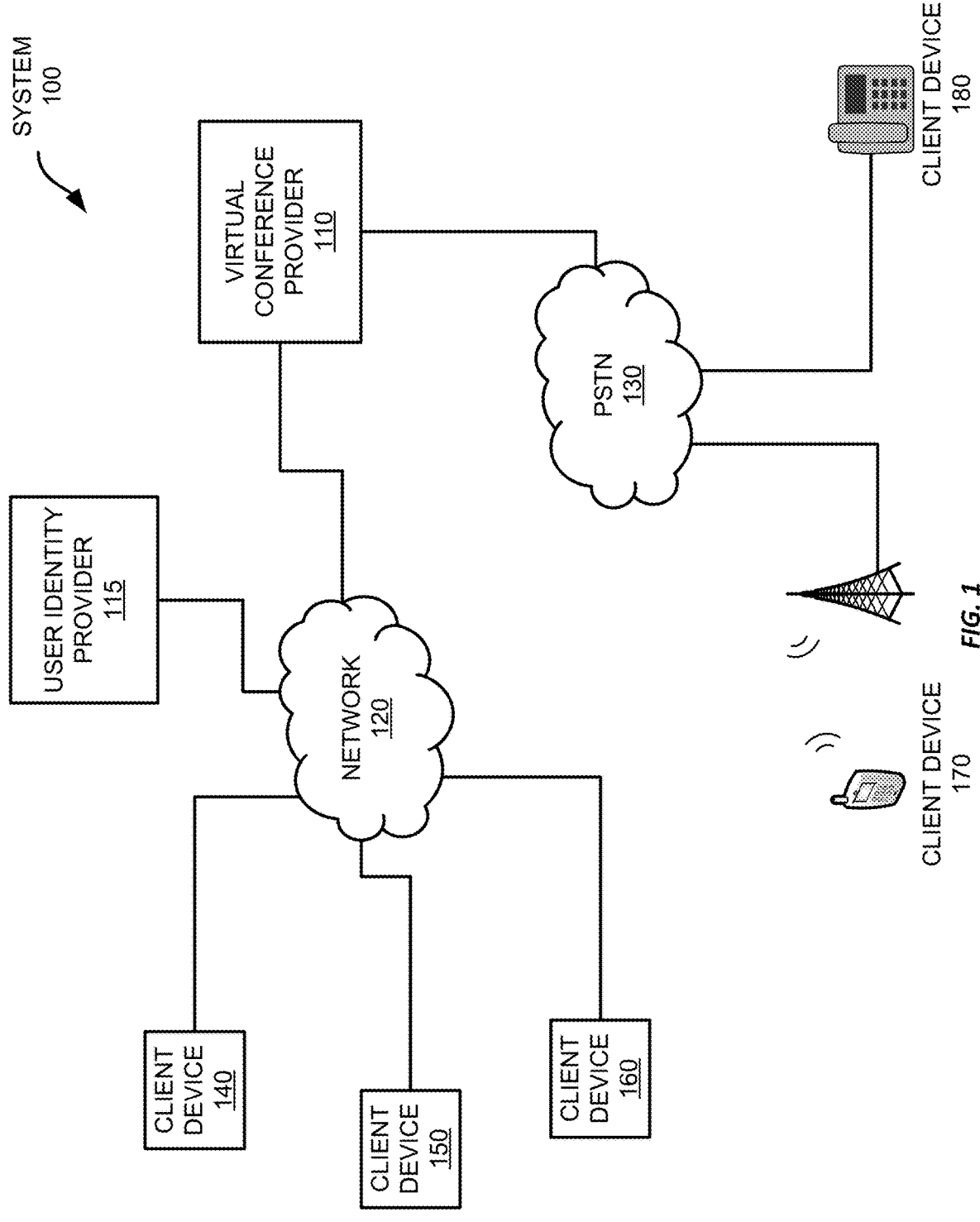
FIGS. 1-3 show example systems for configuring settings for virtual conference participants.

Examples are described herein in the context of automated language identification during virtual conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference (or "videoconference"), participants may engage with each other to discuss any matters of interest. Typically, such participants will interact in a virtual conference using a camera and microphone, which provides video and audio streams (each a "media" stream) that can be delivered to the other participants by the virtual conference provider and be displayed via the various client devices' displays or speakers.

Participants in a virtual conference may wish to record or broadcast a conference for a number of reasons. For instance, an interview conducted through a virtual conference may be featured in a television broadcast, a work meeting may be recorded to create a record of the discussion, or a virtual piano recital may be recorded for nostalgic reasons. Settings on each virtual conference participant's computer can impact the quality of the broadcast or recorded media streams. As an example, the video resolution of the media stream sent from the participant's computer to the virtual conference provider can be configured on the participant's computer (e.g., a client device). While the media streams from a video conference participant's client device can be edited after the conference has concluded, some issues are better addressed by configuring the client device settings before or during the virtual conference. For example, recording a video feed at a higher resolution can provide better video quality than upscaling a recording's resolution after the conference has ended.

Currently, a virtual conference host may be limited to configuring a videoconference participant's settings indirectly through inconvenient workarounds such as checklists or remote desktop connections. Before an interview, the virtual conference host may join a breakout room with the interviewee and guide them through a checklist of settings for their computing device. As an example, the checklist may include enabling high definition (HD) video, selecting video/audio sources, and designating a background for the video feed.

Workarounds such as checklists and remote desktop connections can be time consuming and may not be plausible for virtual conferences with multiple participants. As an example, configuring settings for a panel with a question-and-answer session after could mean configuring tens or hundreds of computers. In addition, settings may have to be set before the conference because it can be impractical to use workarounds to configure settings during the virtual conference. For instance, a change in lighting during the virtual conference could necessitate adjustments to the brightness or contrast settings on a conference participant's computer. However, instructing the participant to modify the settings during the conference is impractical in part because the video conference participant may be engaged in a discussion or otherwise occupied when the changes are requested.

A further limitation of these workarounds is that verifying that the client device's settings are configured properly may be difficult or impossible. A virtual conference host may have to trust that conference participants have correctly completed a checklist without a means to check the participant's settings. While participants may attempt to complete the checklist in good faith, technologically unsophisticated participants may make errors while configuring their devices. In addition, while a host can directly check settings using a remote desktop connection, the host would not know if a participant subsequently changed the settings after the connection has ended.

A further problem is that a virtual conference participant may be unwilling to give a virtual conference host control of the participant's client device without proper safeguards. A virtual conference participant may be comfortable consenting to a host configuring virtual conference settings, but a remote desktop connection can give the host unrestricted control of the participant's computer. This control could plausibly be used to access personal information or download malicious software to the computer. In addition, virtual conferences are often used to conduct business and the participant's client device may be a work computer. Employers and other organizations often have data security policies that may be violated by granting a third-party total control of a work computer. Accordingly, security conscious participants may be reluctant to allow remote access to their client device without meaningful limitations on that access. Therefore, improvements to configuring settings for a virtual conference are desirable.

The settings of a meeting participant's client device can be securely configured and monitored through the virtual conference service without the need for the workarounds mentioned above. The virtual conference can be implemented with client software that can allow virtual conference hosts and participants to take part in the conference. During the meeting, the participants may employ client software on their client devices to capture audio or video information and stream that information to the virtual conference provider. They also receive audio or video information from the virtual conference provider, which is displayed by the respective client device's client software to enable the various users to participate in the meeting.

The client software can allow a conference host to securely configure the meeting participants' client devices. In some circumstances, the virtual conference host may ask for permission to remotely control and configure the interviewee's client device through a remote desktop connection. This remote desktop connection can be used by the host to directly adjust settings for the virtual conference. The virtual conference provider can authenticate the virtual conference host's client software (or "host client") and a conference participant's client software (or "participant client"). After requesting permission to configure a participant client from the configuration process, the host client can request authentication information (or "meeting context") from the virtual conference provider's authentication process. The host client can send an invitation to a virtual conference, and the meeting context, to the participant client. The participant client can provide the meeting context to the authentication process to validate the invitation, and, after authentication, the participant client can decide whether to allow the host client to configure the participant's settings.

Configuring a conference participant's settings through the virtual conference service can allow for greater security and can mitigate the risk of unauthorized access to the participant client. A common type of security threat, called a phishing attack, is when a bad actor gains access to a computer by faking a message's source. Phishing attacks are less likely when configuration is performed between authenticated client software and not through third party applications because the bad actor would have to trick the video conference service's authentication process. For instance, the host client can only permit a participant client to be configured by devices or software that are connected to the same conference as the participant client. Also, a graphical user interface on the participant client can identify a user account, an email address, or an internet protocol address attempting to gain control of the host client. In addition, the participant client can limit the host client's access to the client device. The participant client can expose specified settings for configuration by a host client while a remote desktop connection may have unrestricted access to the participant client's client device.

This illustrative example is given to introduce the reader to the general subject matter discussed herein and the disclosure is not limited to this example. The following sections describe various additional non-limiting examples and examples of controlling virtual conference settings.

Referring now to FIG. 1, FIG. 1 shows an example system 100 that provides virtual conferencing functionality to various client devices. The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide virtual conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity. In some instances, video conference provider 110 may provide a user profile language to virtual conference provider 210.

Figure 2:
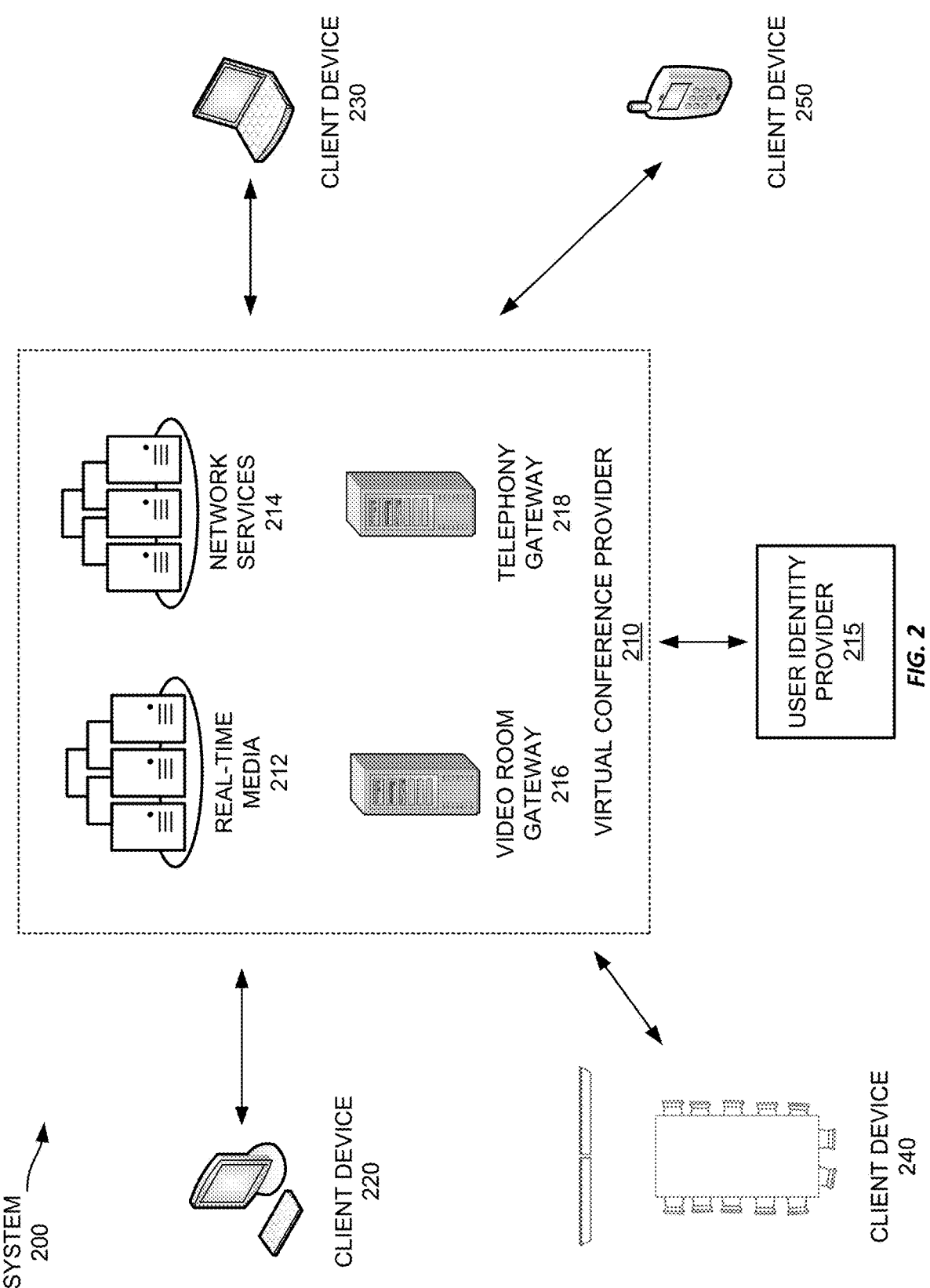

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the video conference provider 110 using a client device 140-180 and select an option to create a new meeting. Such an option may be provided in a webpage accessed by a client device 140-160 or client application (or "client software") executed by a client device 140-160. Client software can include one or more host clients or participant clients. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, a meeting language, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the virtual conference provider 110. They also receive audio or video information from the virtual conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the virtual conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively. The user identity provider 115 may provide a user profile language to the virtual conference provider 110.

For telephony devices, e.g., client devices 170-180, the user may place a telephone call to the virtual conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the virtual conference provider 110 or it may be provided in an end-to-end configuration where media streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted media streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt media content transmitted during the meeting. Thus the client devices 140-160 may securely communicate with each other during the meeting.

Further, in some examples, certain types of encryption may be limited by the types of devices participating in the meeting. For example, telephony devices may lack the ability to encrypt and decrypt media streams. Thus, while encrypting the media streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides video conferencing functionality to various client devices 220-250. The client devices 220-250 include two conventional computing devices 220-230, dedicated equipment for a video conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of video conference functionality, thereby enabling the various client devices to create and participate in video conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed media streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing. In some instances, the media stream may contain metadata indicating a language for the media stream or the client devices 220-250. The language may be a device language provided by software on the client device or a language selected by a user of the client device via a graphical user interface (GUI).

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives media streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing media streams, the real-time media servers 212 may also decrypt incoming media streams in some examples. As discussed above, media streams may be encrypted between the client devices 220-250 and the virtual conference provider 210. In some such examples, the real-time media servers 212 may decrypt incoming media streams, multiplex the media streams appropriately for the various clients, and encrypt the multiplexed streams for transmission.

In some examples, to provide multiplexed streams, the virtual conference provider 210 may receive media streams from the various participants and publish those streams to the various participants to subscribe to and receive. Thus, the virtual conference provider 210 notifies a client device, e.g., client device 220, about various media streams available from the other client devices 230-250, and the client device 220 can select which media stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted media streams at a user's request. For example, the meeting host may be able to request that the meeting be recorded or that a transcript of the audio streams be prepared, which may then be performed by the real-time media servers 212 using the decrypted media streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted media streams at the virtual conference provider, such as monitoring video or audio quality, adjusting or changing media encoding mechanisms, etc.

It should be appreciated that multiple real-time media servers 212 may be involved in communicating data for a single meeting and media streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive media streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing media streams may be distributed throughout the virtual conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the virtual conference provider under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, a meeting language, a source language or a target language for translation, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving media streams. In some instances, the real-time media servers 212 may store a source language, target language, user profile language, meeting language, or identified language for the media streams sent and received by the server.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle media streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive media streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the video conference provider to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3:
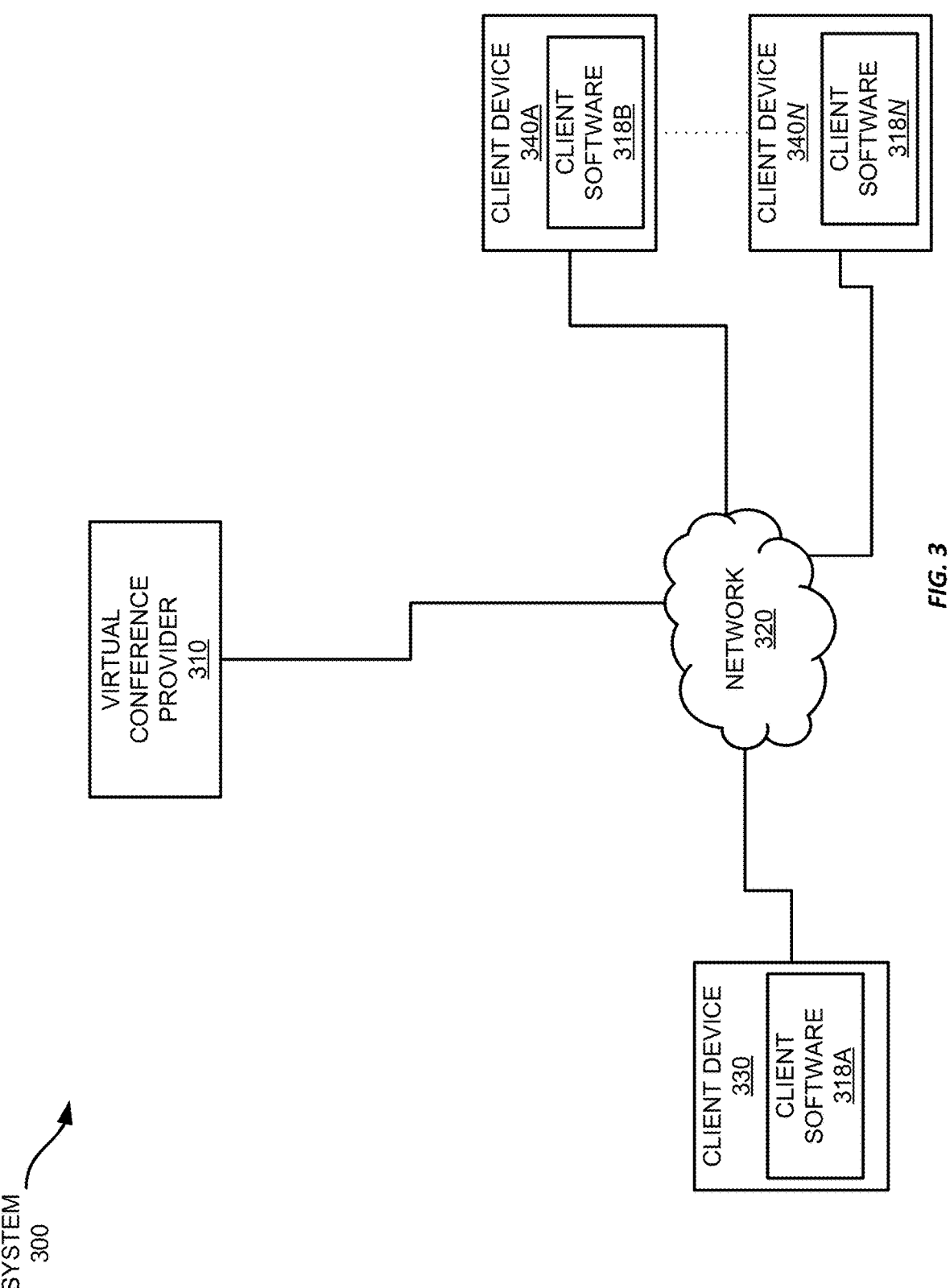

Referring now to FIG. 3, FIG. 3 shows an example system 300 for configuring settings for virtual conference participants. The system 300 includes a virtual conference provider 310, which can be connected to multiple client device 330, 340*a-n* via one or more intervening communication networks 320. In this example, the communications network 320 is the internet, however, any suitable communications network or combination of communications network may be employed, including LANs (e.g., within a corporate private LAN), WANs, etc.

Each client device 330, 340*a-n* executes virtual conference software, which connects to the virtual conference provider 310 and can be used to join meetings. During a meeting, the various participants (using virtual conference software or "client software" at their respective client devices 330, 340*a-n*) are able to interact with each other to conduct the meeting, such as by viewing video feeds and hearing audio feeds from other participants, and by capturing and transmitting video and audio of themselves (e.g., media streams).

Client devices 330, 340*a-n* may join virtual conferences hosted by the virtual conference provider 310 by connecting to the virtual conference provider 310 and joining a desired virtual conference, generally as discussed above with respect to FIGS. 1-2. Once the participants have joined the conference, they may interact with each other in real time by exchanging audio and video feeds (e.g., media streams).

However, participants may wish to configure settings for one or more client devices or client software participating in the conference for many reasons including, for instance, to ensure adequate video and audio quality for a televised interview performed through the video conference provider.

Configuration functionality can be provided by the client software 318*a-n* running on client devices 330, 340*a-n*. A first instance of client software 318*a-n* can send a request for configuration functionality to a second instance of client software 318*a-n* via network 320. The request can be a request for permission to modify the client software's settings or to modify settings of a client device 330, 340*a-n*. Upon receiving permission from the second instance, the first instance of client software can modify the second instance's settings via commands sent by the network 320.

In addition, the virtual conference provider 310 operates a number of servers that can provide authentication functionality, and facilitate configuration functionality for client software 318*a-n* running on from client devices 330, 340*a-n*. The authentication functionality can be used by the second instance of client software 318*a-n* to verify a request for configuration functionality from the first instance of client software 318*a-n*. The request for configuration functionality can be a request for permission to configure settings on the second instance of client software. The authentication functionality can verify that the request for configuration functionality is legitimate and requests for configuration functionality may only be enabled with permission from the virtual conference provider 310.

The virtual conference provider 310 can provide configuration functionality by generating and authenticating a meeting context for a host client or a participant client. A meeting context can include one or more unique identifiers including, for instance, one or more of a unique identifier for client software requesting authentication functionality, a unique identifier for a meeting, and a unique identifier for instance of client software that is the target of the request. The meeting context can be signed with a private key for the authentication service and the client software 318*a-n* or client devices 330, 340*a-n* receiving the meeting context from the authentication process 316 can verify the meeting context with a public key for the authentication process 316.

The authentication functionality can be requested from the virtual conference provider 310 by client software such as a host client or a participant client, and multiple instances of client software within a meeting can request authentication functionality in response to receiving requests to be remotely configured. The client software 318*a-n* can send a request to configure functionality in a remote client device and the meeting context that was generated in response to a request for authentication functionality to one or more targets of the configuration request. The targets can be client software or client devices that the requesting client software (or "requestor") would like to configure, and the meeting context can include unique identifiers corresponding to the targets.

The virtual conference provider can create and sign a meeting context for each target with the context including a unique identifier for the requestor, a unique identifier for the target, and a unique identifier for the meeting. The virtual conference provider 310 can return the meeting context to the requestor and the context can be signed by the requestor's private key and forwarded to a target. The target can verify that the context is legitimate with a public key for the virtual conference provider 310 or a public key for the requestor. The target can also compare the meeting identifier to the meeting identifier against the meeting identifier for the conference that the target is currently attending to mitigate the risk that a past meeting context is being reused. In addition, the meeting context's signature may include a timestamp or an expiration date/time.

The target may provide the meeting context, received from the requestor, to the virtual conference provider 310 for verification. The meeting context may be provided to the virtual conference provider 310 as an alternative or in addition to verification of the context by the target using public keys and the virtual conference provider 310 may verify the provided context with public keys for the authentication process or requestor. After verification, the virtual conference provider 310 may provide a session cookie, indicating that the request is authentic, to the target. The target may provide the session cookie to the virtual conference provider 310 to enable configuration functionality. In some implementations, the target may provide a signed permission to the virtual conference provider 310 to enable configuration functionality. The signed permission may be provided in addition to, or as an alternative to, the session cookie. The signed permission can be configurable with the target indicating which settings are exposed to configuration functionality. For instance, the target may consent to the requestor configuring audio sources but not to the requestor selecting video sources.

Configuration functionality can be provided through communication between the requestor and target and the functionality can enable a requestor to select one or more settings for a target via messages exchanged through network 320. The settings can include audio sources, video sources, backgrounds for a video feed, audio filters, video filters, video resolution, frame rate, video bitrate, white balance, brightness, enable/disable high-definition video, enable/disable high-definition video, lowlight correction, mute/unmute audio streams, enable/disable video streams, etc. The target can grant permission that allows the requestor to configure some or all of the settings listed above using a graphical user interface or a command line interface. The requestor may configure settings for each target individually or the requestor may push preconfigured setting profiles to the target via the virtual conference provider 310. Configuration functionality may be enabled by exchanging signed messages directly between the requestor and target or by exchanging signed messages via the virtual conference provider 310.

In some circumstances, multiple instances of client software attending a meeting can request configuration or authentication functionality simultaneously. However, a meeting host may restrict permission to request authentication functionality or configuration functionality to a subset of the client software that have been invited to a meeting. In addition, the meeting host may limit permission to request authentication functionality or configuration functionality to instances of client software that have joined a meeting. A requestor or a target can be any client in a meeting, including a host client or a participant client.

Figure 4:
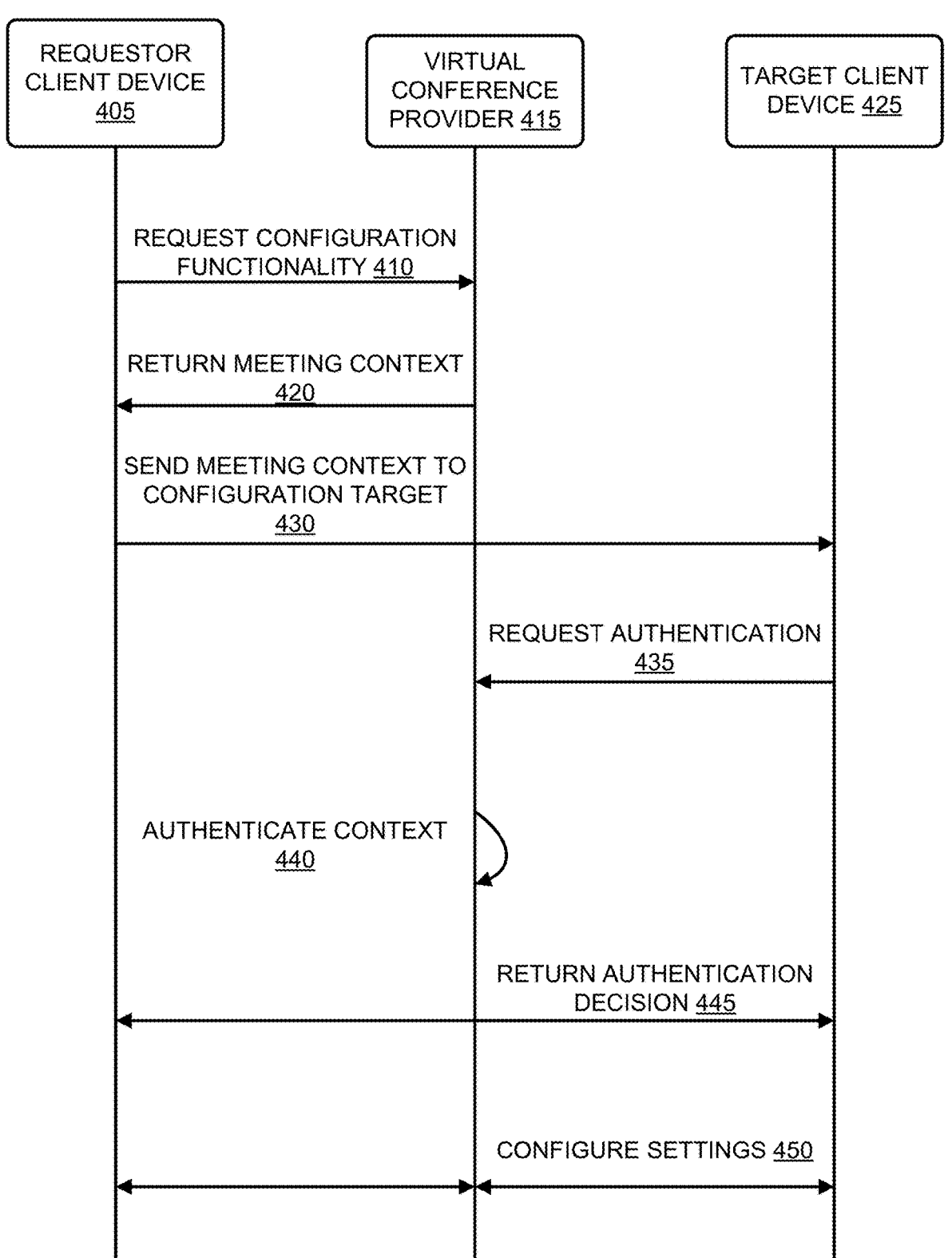
FIG. 4 shows a sequence diagram for configuring a virtual conference participant's settings.

Referring now to FIG. 4, FIG. 4 shows an example sequence diagram for a system that provides remote configuration of videoconference participant's settings. The sequence can begin with a requestor client device 405 sending a request for configuration functionality 410 to the virtual conference provider 415. The request for configuration functionality 410 can be received by a configuration process of the virtual conference provider 415 and the request can be forwarded to the authentication process of the virtual conference provider 415.

The meeting context can be sent from the virtual conference provider 415 to the second client device 405 at 420. The meeting context can be generated by the virtual conference provider 415 and the meeting context can include one or more of a target client device unique identifier, a meeting identifier, or a requestor client device identifier corresponding to the target client device 425. The requestor client device 405 and the target client device 425 may be client software such as host client or participant client in some implementations. The meeting unique identifier can correspond to a meeting hosted by the virtual conference provider 415 that the requestor client device 405 and the target client device 425 are attending.

At 430, the requestor client device 405 can forward the meeting context to the target client device 425 (or "target/configuration target"). The meeting context can be signed by at least one private key of the requestor client device 405 or the virtual conference provider 415, and the target client device 425 may verify the signature or signatures using a public key for the requestor client device 405 or the video conference provider 415. If the target client device 425 can verify the meeting context, the sequence 400 may proceed to 450. In some implementations, the target client device 425 may request authentication at 435. To request authentication, the target client device 425 may send the meeting context from 430 to the virtual conference provider 415.

At 440, the virtual conference provider 415 may authenticate the context using one or more of a target client device public key, a requestor client device public key or the virtual conference provider public key to verify one or more signatures included in the meeting context. The virtual conference provider may also or alternatively authenticate the context by comparing the target client device unique identifier, the requestor client device unique identifier, or the meeting unique identifier to the information for the meeting attended by the requestor client device and the list of meeting attendees.

If the virtual conference provider 415 is able to authenticate the meeting context at 440, the virtual conference provider 415 can return an authentication decision to one or more of the requestor client device 405 or the target client device 425 at 445. The authentication decision can indicate to the target client device 425 that the request to configure settings is actually from the requestor client device 405. At 450, the requestor client device 405 and the target client device 425 can directly exchange messages about configuring the second client device's settings through a network connection or via the virtual conference provider 415. The exchanged messages can include the target client device 425 granting permission for the requestor client device 405 to configure the requestor client device 424. The messages can include a command from the requestor client device 405 to change a configuration parameter for client software running on the target client device 425. The target client device 425 can change the configuration of client software running on the requestor client device in response to the command. In some implementations, the messages about configuring settings can be sent directly between the requestor client device 405 and the target client device 425.

Figure 5:
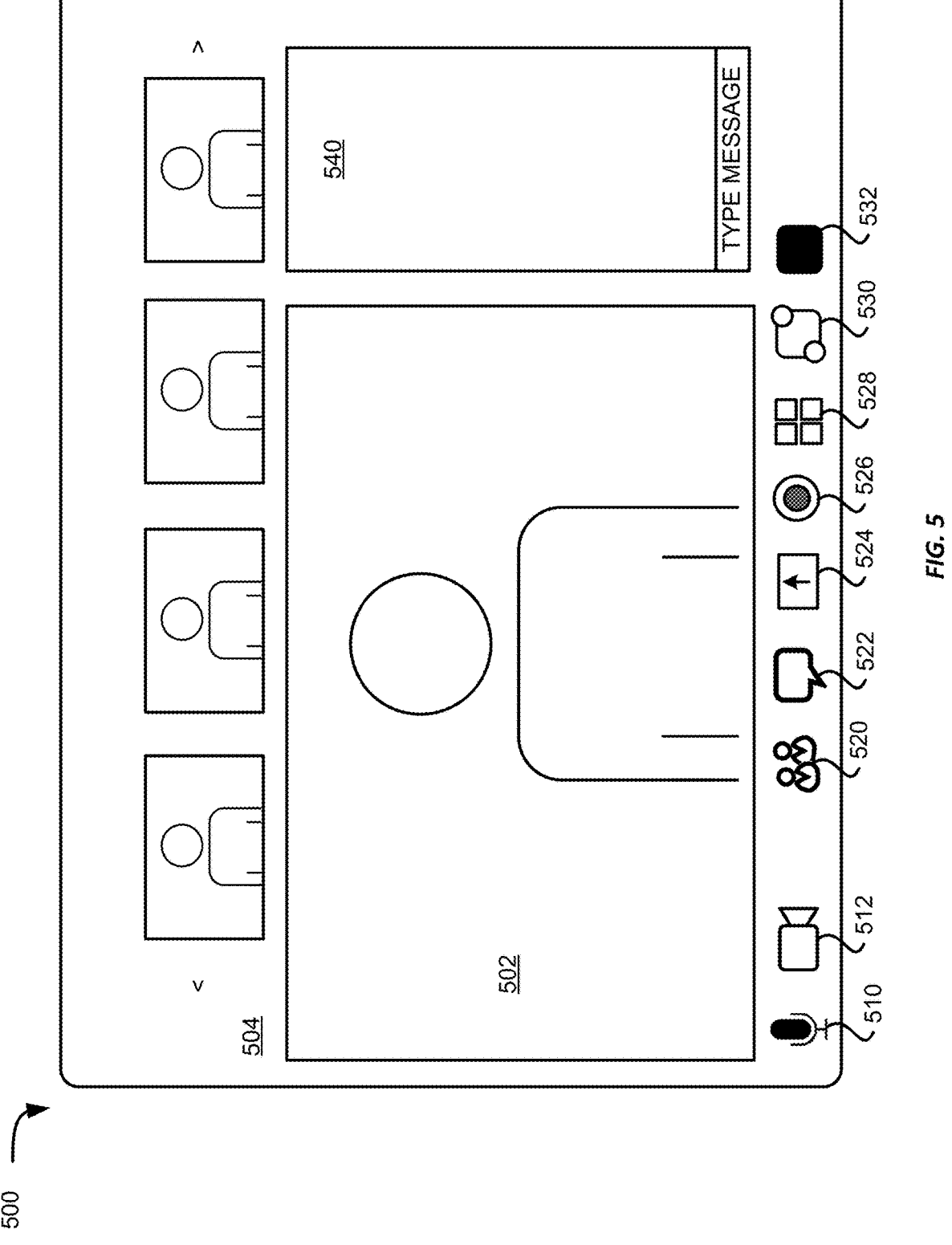
FIGS. 5-6 show example graphical user interfaces ("GUIs") for configuring settings for virtual conference participants.

Referring now to FIG. 5, FIG. 5 illustrates an example graphical user interface ("GUI") 500 for a software client that can configure settings for virtual conference participants. A client device, e.g., client device 330 or client devices 340a-n, executes a client software as discussed above, which in turn displays the GUI 500 on the client device's display. In this example, the GUI 500 includes a speaker view window 502 that presents the current speaker in the video conference. Above the speaker view window 502 are smaller participant windows 504, which allow the participant to view some of the other participants in the video conference, as well as controls ("<" and ">") to let the host scroll to view other participants in the video conference. Editing process 418 can use information from the controls to determine which media streams to display in the edited video. For instance, if a particular media stream is selected by multiple users, then that media feed may be shown in the edited video. Information from the controls can also be used by selection/identification process 414 to select media streams that are recorded. On the right side of the GUI 500 is a chat window 540 within which the participants may exchange chat messages.

Beneath the speaker view window 502 are a number of interactive elements 510-530 to allow the participant to interact with the video conference software. Controls 510-512 may allow the participant to toggle on or off audio or video streams captured by a microphone or camera connected to the client device. Control 520 allows the participant to view any other participants in the video conference with the participant, while control 522 allows the participant to send text messages to other participants, whether to specific participants or to the entire meeting. Control 524 allows the participant to share content from their client device. Control 526 allows the participant to toggle recording of the meeting. Control 528 allows the user to select an option to join a breakout room. Control 530 allows a user to launch an app within the video conferencing software, such as to access content to share with other participants in the video conference. Control 532 allows a user to request configuration functionality for one or more instances of client software, and, if the request is granted, control 532 can be used to open the example graphical user interface ("GUI") 600 from FIG. 6 to enable the user to control configuration settings on remote client devices.

In some implementations, the graphical user interface 500 can be displayed on a requestor client device and used to configure the settings of a target client device. For instance, the requestor client device 405 can use graphical user interface 500 to configure the settings of the target client device 425 at 450. In such an implementation, selections made in the graphical user interface 500 can be passed from the requestor client device 405 to the target client device either directly or via the virtual conference provider 415.

Figure 6:
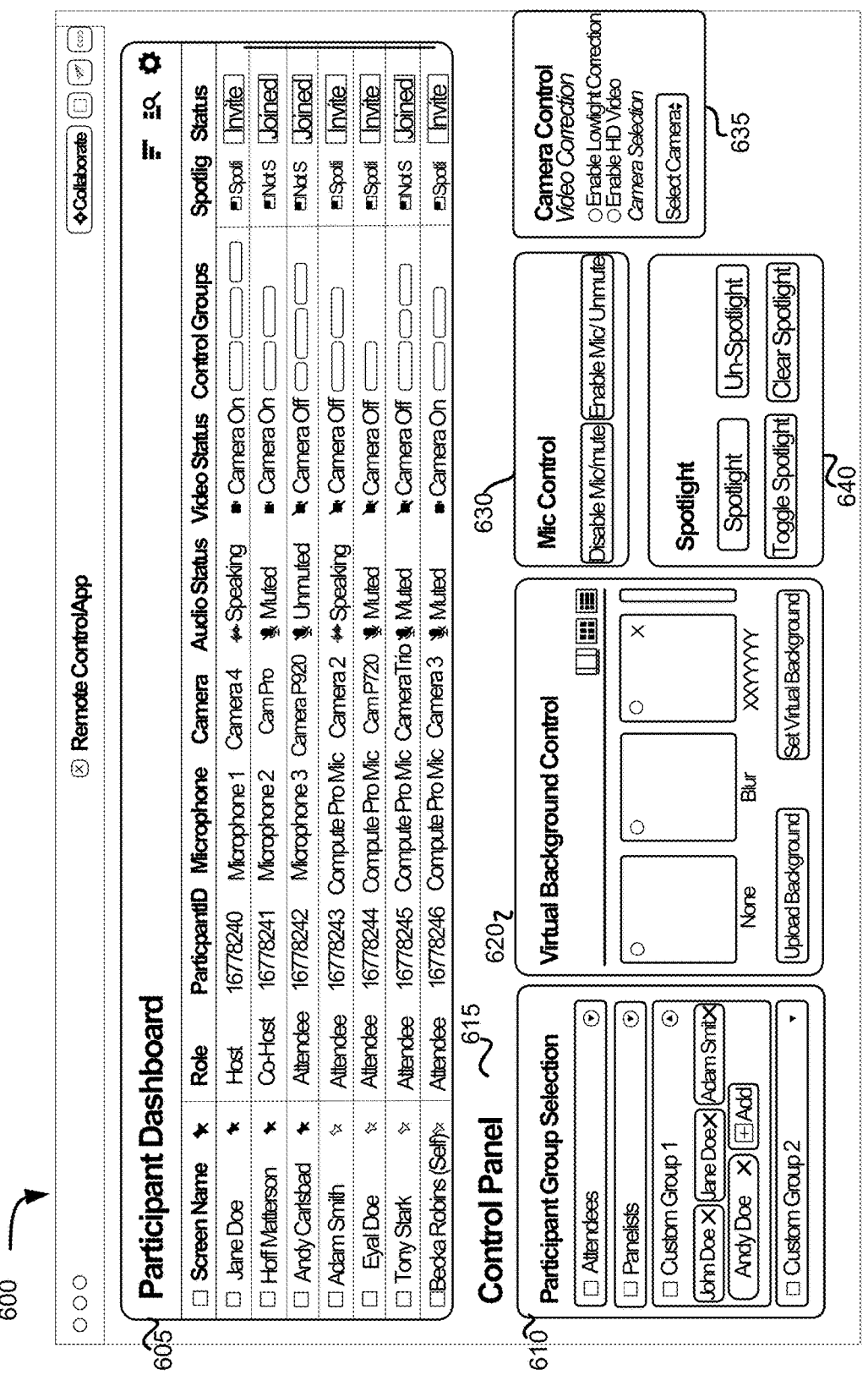

Referring now to FIG. 6, FIG. 6 illustrates an example graphical user interface ("GUI") 600 for a software client that can configure settings for virtual conference participants. Graphical user interface 600 can be a detailed interface for configuring settings for multiple conference participants simultaneously, and the graphical user interface may be accessed by selecting the control button 532 in the graphical user interface 500. Participant dashboard 605 shows a list of attendees in a video conference with each attendee's screen name and a list of information about each attendee. For instance, each attendee can be associated with a role that shows the permissions for each client device participating in the virtual conference. The role can include host, co-host, or attendee with the host corresponding to the account or client device that initiated the virtual conference with the virtual conference provider. The host can have the highest level of permission within the conference and can take administrative actions such as removing participants from the meeting, terminating the meeting, sending participants to breakout rooms or initiating a recording of the conference. Co-hosts can be participants who did not initiate the meeting but who have similar administrative permissions to the host. In some situations, only a host or co-host may be permitted to remotely configure the settings for other meeting participants without administrative permissions (or "attendees").

The participant dashboard 605 can indicate information about each participant such as a unique identifier for a participant's client device or client software, which microphone or camera is being used by each attendee, audio status (e.g., whether the participant is muted, speaking or silent), and video status (e.g., whether the participant's camera is on or off). In addition, the participant dashboard can be used to select several participants so that the settings for multiple client devices can be configured simultaneously. Several participants can be joined into control groups using the participant group selection 610 so that subsets of the meeting participants can be selected without having to choose individual participants through the participant dashboard 605. Conference participants may not be included in a control group and a participant can be a member of multiple control groups. The status column in the participant dashboard 605 can indicate whether participants have consented to (or "joined") the configuration functionality and the column can be used to request (or "invite") participants to join the configuration functionality.

The control panel 615 can be used to configure virtual conference participant's settings, and, for example, the virtual background control 620 can be used to select a virtual background for virtual conference participants using the virtual background control 625. Virtual backgrounds are simulated environments that appear behind a participant in a video conference. In addition, the participant's microphones can be muted, unmuted using the mic control 630 which can also be used to enable/disable participant control of their mute buttons. Similarly, the camera control 635 can be used to configure camera settings such as enabling high-definition video, enabling lowlight compensation, selecting a camera, and turning the participant's camera on/off. The control panel 615 can also be used to spotlight individual meeting participants. "Spotlighting" a participant can mean that the participant is shown prominently in the virtual conference with the participant's video feed placed at the top of a list of participants or pinned to the graphical user interfaces of other participants.

Figure 7:
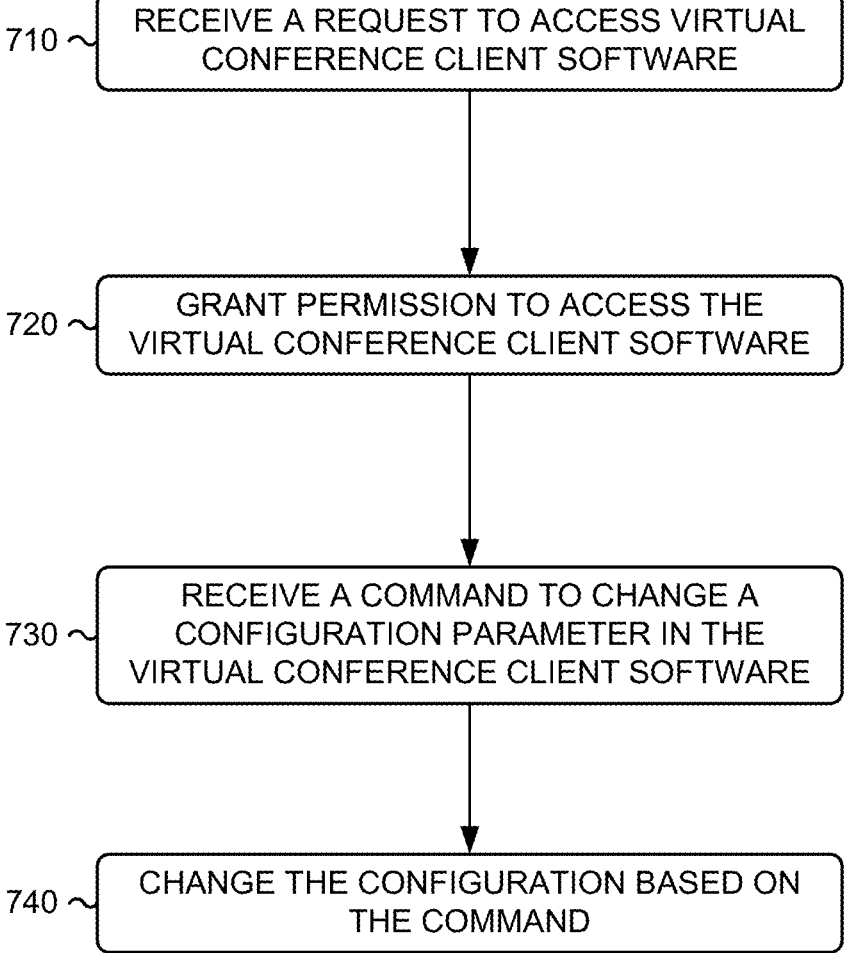
FIG. 7 shows an example method for configuring settings for virtual conference participants.

Referring now to FIG. 7, FIG. 7 shows an example method 700 for automated video editing for a virtual conference. This example method 700 will be described with respect to the systems 100-400 shown in FIGS. 1-4, the example GUIs 500-500 shown in FIGS. 5-6; and the example computer system 800 shown in FIG. 8; however, any suitable systems or GUIs according to this disclosure may be employed.

At block 710, a request to access virtual conference client software can be received. The request can be received by first client device (e.g., target client device) such as client device(s) 140-180, 220-250, 330, 340*a-n* or client software 318*a-n*. The request can be received from a virtual conference provider 210, 310 and the request can be generated by a second client device (e.g., requestor client device) such as client device(s) 140-180, 220-250, 330, 340*a-n* or client software 318*a-n* during a virtual conference. A participant controlling the requestor client device can select one or more client devices as targets for the request using a graphical user interface (GUI) such as the graphical user interface 600 disclosed with respect to FIG. 6. A profile associated with the requestor client device may include one or more settings for target client devices that are automatically pushed to all meeting participants, to one or more targets, or to groups of targets (e.g., pushed to all co-hosts). The participant controlling the requestor client device can individually configure the settings for the targets through the participant dashboard 605, or the participant controlling the requestor client device could add several targets to control groups using the participant group selection 610 so that groups of targets can be configured simultaneously.

In some embodiments, the request may be received directly from the requestor client device. The request can be received via network(s) 120, 320 and the request can identify the target client device as a target. The request can include a meeting context and the request can be signed using a private key of the requestor client device or a private key of an authentication process of the virtual conference provider. The requestor client device may retrieve the meeting context from the virtual conference provider prior to the request being sent to the target client device.

At block 720, permission to access the virtual conference client software can be granted. Permission may be granted to the requestor client device by the target client device after the device has sent the meeting context to the virtual conference provider for authentication. In some embodiments, the target client device may authenticate the request by checking signatures on the request using a public key for the virtual conference provider or a private key for the second client device. In some embodiments, the target client device may provide the request to the virtual conference provider and the target client device can receive a determination of the request's authenticity from the virtual conference provider. And while this example employs an authentication mechanism, in some examples, authentication may be omitted or performed according to any suitable technique. The target client device and the requestor client device can be similar to the example computing device 800 described below in relation to FIG. 8.

At block 730, a command to change a configuration parameter in the virtual conference client software can be received at the first client device. The request can be generated by the requestor client device and the request can be received at the target client device either from the requestor client device or via the configuration process of the virtual conference provider. The request can be received via network(s) 120, 320 and the request can be generated using a graphical user interface such as graphical user interface 500 or graphical user interface 600.

At block 740, a configuration can be changed based on the command. The configuration can be a configuration for client software running on the first client device. In some circumstances multiple configuration settings (or "a set of configuration settings") can generated by the requestor client device can be received simultaneously. The command may be received at the target client device from the configuration process of the virtual conference provider, but the command may be generated by the second client device. The configuration can include audiovisual settings including selecting video feeds or audio feeds.

Figure 8:
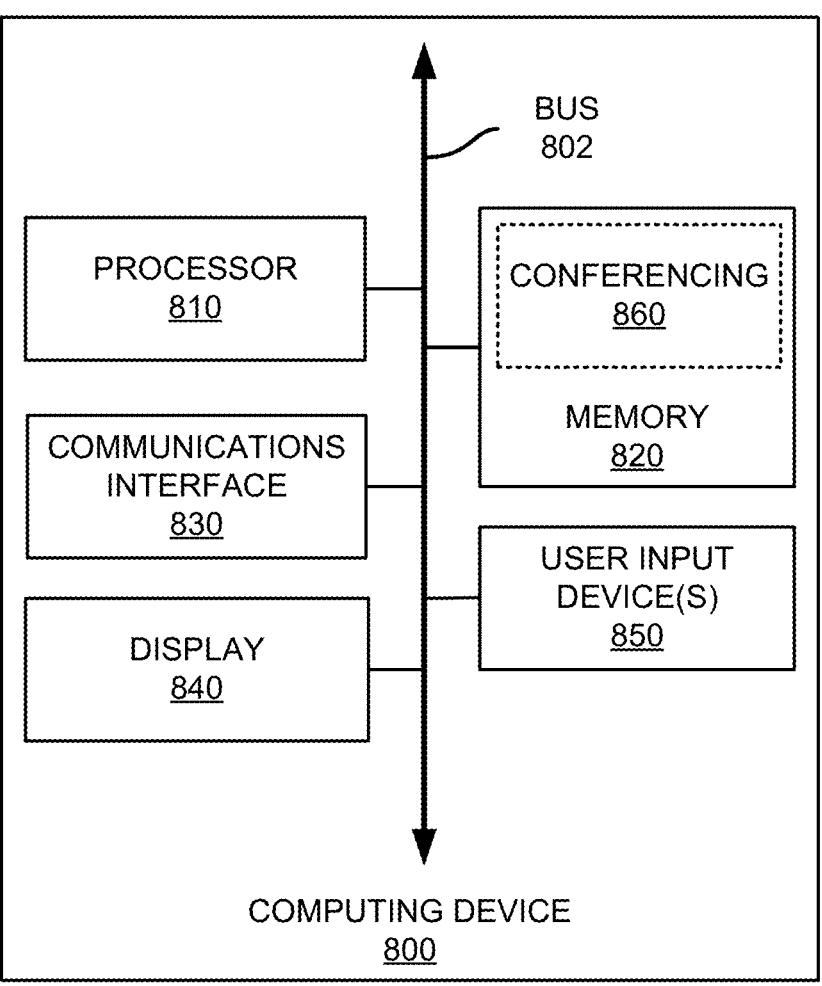
FIG. 8 shows an example computing device suitable for use with example systems and methods for editing media streams from virtual conferences.

Referring now to FIG. 8, FIG. 8 shows an example computing device 800 suitable for use in example systems or methods for remotely configuring a virtual conference participant's settings. The example computing device 800 includes a processor 810 which is in communication with the memory 820 and other components of the computing device 800 using one or more communications buses 802. The processor 810 is configured to execute processor-executable instructions stored in the memory 820 to perform one or more methods for remotely configuring a virtual conference participant's settings, such as part or all of the example method 700 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a video conferencing application 860 to enable a user to join and participate in one or more virtual spaces or in one or more conferences, such as a conventional conference or webinar, by receiving media streams from a video conference provider, sending media streams to the video conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:

receiving, by a first virtual conference client software that is executing on a first computing device, a request to access the first virtual conference client software by a second virtual conference client software of a second computing device, the first virtual conference client software of the first computing device and the second virtual conference client software of the second computing device being connected to a virtual conference hosted by a virtual conference provider and the request comprising a meeting context comprising at least one of a unique identifier or a meeting identifier;

authenticating, by the first virtual conference client software that is executing on the first computing device, the request from the second virtual conference client software of the second computing device, comprising verifying a cryptographic signature of the meeting context using a public key of the virtual conference provider;

granting, by the first virtual conference client software of the first computing device and to the second virtual conference client software of the second computing device, permission to access the first virtual conference client software executed by the first computing device;

receiving, by the first virtual conference client software of the first computing device from the second virtual conference client software of the second computing device, a command to change a configuration parameter of the first virtual conference client software that is executing on the first computing device;

changing, by the first computing device, the configuration parameter of the first virtual conference client software that is executing on the first computing device based on the command; and transmitting, by the first virtual conference client software that is executing on the first computing device, a media stream in accordance with the changed configuration parameter.

2. The method of claim 1, wherein changing the configuration parameter further comprises:

receiving, by the first computing device and from the second computing device, a set of configuration settings.

3. The method of claim 1, wherein the configuration parameter comprises audiovisual settings.

4. The method of claim 1, wherein changing the configuration parameter further comprises:

selecting, by the first computing device, a set of audiovisual feeds that are displayed by the first computing device.

5. The method of claim 1, wherein the granting further comprises:

joining, by the first computing device, a virtual conference with the second computing device.

6. The method of claim 5, wherein the configuration parameter is changed after the first computing device and the second computing device have joined the virtual conference.

7. The method of claim 1, wherein the meeting context is digitally signed by using a private key of the virtual conference provider corresponding to the public key of the virtual conference provider.

8. A system comprising:

one or more processors configured to:

receive, by a first virtual conference client software that is executing on a first computing device, a request to access the first virtual conference client software by a second virtual conference client software of a second computing device, the first virtual conference client software of the first computing device and the second virtual conference client software of the second computing device being connected to a virtual conference hosted by a virtual conference provider and the request comprising a meeting context comprising at least one of a unique identifier or a meeting identifier;

authenticate, by the first virtual conference client software that is executing on the first computing device, the request from the second virtual conference client software of the second computing device, comprising verifying a cryptographic signature of the meeting context using a public key of the virtual conference provider;

grant, by the first virtual conference client software of the first computing device and to the second virtual conference client software of the second computing device, permission to access the first virtual conference client software executed by the first computing device;

receive, by the first virtual conference client software of the first computing device from the second virtual conference client software of the second computing device, a command to change a configuration parameter of the first virtual conference client software that is executing on the first computing device;

change, by the first computing device, the configuration parameter of the first virtual conference client software that is executing on the first computing device based on the command; and transmit, by the first virtual conference client software that is executing on the first computing device, a media stream in accordance with the changed configuration parameter.

9. The system of claim 8, wherein changing the configuration parameter further comprises: receiving, by the first computing device and from the second computing device, a set of configuration settings.

10. The system of claim 8, wherein the configuration parameter comprises audiovisual settings.

11. The system of claim 8, wherein changing the configuration parameter further comprises: selecting, by the first computing device, a set of audiovisual feeds that are displayed by the first computing device.

12. The system of claim 8, wherein the granting further comprises:

joining, by the first computing device, a virtual conference with the second computing device.

13. The system of claim 12, wherein the configuration parameter is changed after the first computing device and the second computing device have joined the virtual conference.

14. The system of claim 8, wherein the meeting context is digitally signed by using a private key of the virtual conference provider corresponding to the public key of the virtual conference provider.

15. A non-transitory computer-readable medium storing a set of instructions, the set of instructions comprising:

one or more instructions that, when executed by one or more processors of a device, cause the device to:

receive, by a first virtual conference client software that is executing on a first computing device, a request to access the first virtual conference client software by a second virtual conference client software of a second computing device, the first virtual conference client software of the first computing device and the second virtual conference client software of the second computing device being connected to a virtual conference hosted by a virtual conference provider and the request comprising a meeting context comprising at least one of a unique identifier or a meeting identifier;

authenticate, by the first virtual conference client software that is executing on the first computing device, the request from the second virtual conference client software of the second computing device, comprising verifying a cryptographic signature of the meeting context using a public key of the virtual conference provider;

grant, by the first virtual conference client software of the first computing device to the second virtual conference client software of the second computing device, permission to access the first virtual conference client software executed by the first computing device;

receive, by the first virtual conference client software of the first computing device from the second virtual conference client software of the second computing device, a command to change a configuration parameter of the first virtual conference client software that is executing on the first computing device;

change, by the first computing device, the configuration parameter of the first virtual conference client software that is executing on the first computing device based on the command; and transmitting, by the first virtual conference client software that is executing on the first computing device, a media stream in accordance with the changed configuration parameter.

16. The non-transitory computer-readable medium of claim 15, wherein changing the configuration parameter further comprises: receiving, by the first computing device and from the second computing device, a set of configuration settings.

17. The non-transitory computer-readable medium of claim 15, wherein the configuration parameter comprises audiovisual settings.

18. The non-transitory computer-readable medium of claim 15, wherein changing the configuration parameter further comprises: selecting, by the first computing device, a set of audiovisual feeds that are displayed by the first computing device.

19. The non-transitory computer-readable medium of claim 15, wherein the granting further comprises: joining, by the first computing device, a virtual conference with the second computing device.

20. The non-transitory computer-readable medium of claim 15, wherein the meeting context is digitally signed by using a private key of the virtual conference provider corresponding to the public key of the virtual conference provider.

* * * * *